United States Patent [19]
Leimbach et al.

[11] 3,725,707
[45] Apr. 3, 1973

[54] FIELD SUB-ASSEMBLY FOR UNIVERSAL ELECTRIC MOTORS

[75] Inventors: Wendell B. Leimbach; James W. Marshall, Baltimore; Salvatore R. Abbratozzato, Towson, all of Md.

[73] Assignee: Black and Decker Manufacturing Company, Towson, Md.

[22] Filed: May 5, 1971

[21] Appl. No.: 140,374

[52] U.S. Cl. ............................................. 310/71
[51] Int. Cl. ............................................. H02k 11/00
[58] Field of Search........310/71, 214, 215, 218, 216, 310/217, 259; 339/276, 276 C, 276 T, 258

[56] References Cited

UNITED STATES PATENTS 3,189,857  6/1965  Jones.................................336/198

Primary Examiner—R. Skudy
Attorney—Leonard Bloom, Joseph R. Slotnik and Edward D. Murphy

[57] ABSTRACT

For a universal electric motor, a wound field sub-assembly including a core and a pair of coils wound in slots therein, wherein the solid, magnet wire of the coils is connected to the stranded, lead wire via a simplified and improved connector and process. A connector, insulatively mounted on the field core, receives the magnet wire and provides for later connection to stranded lead wire or another circuit element.

The process includes, in addition to the conventional winding of the coils on the core, the step of mechanically securing the start and end portions of the wound coil to the terminal before control thereof is released by the winding apparatus.

24 Claims, 5 Drawing Figures

PATENTED APR 3 1973 3,725,707
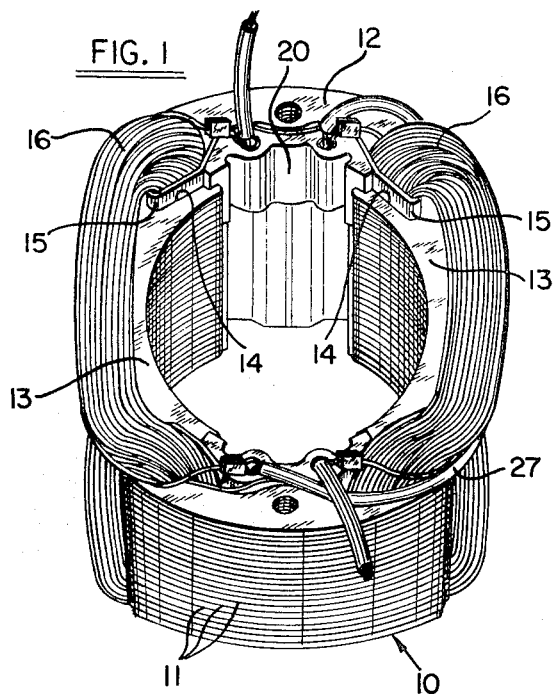
FIG. 1
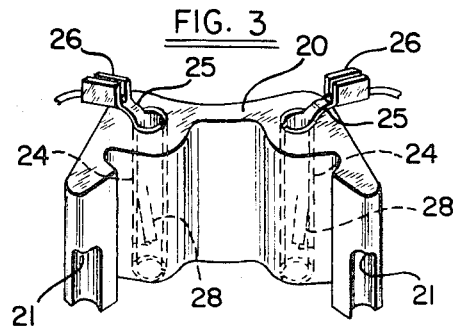
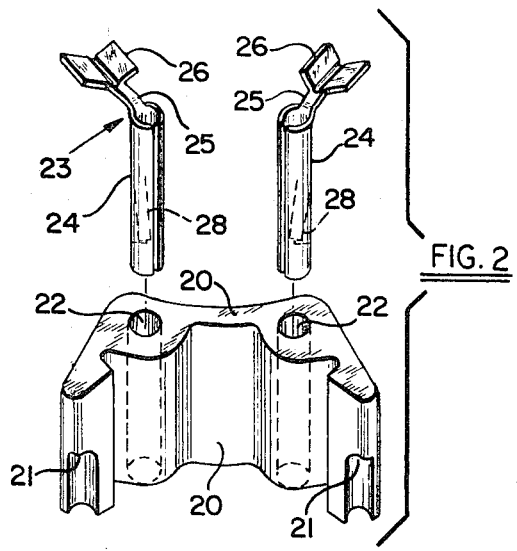
FIG. 3
FIG. 2
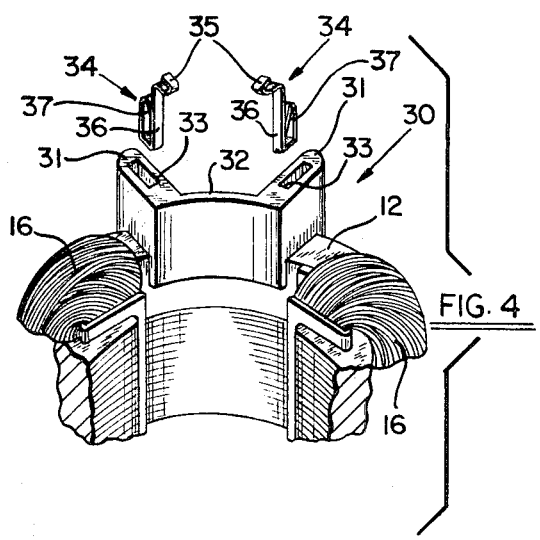
FIG. 4
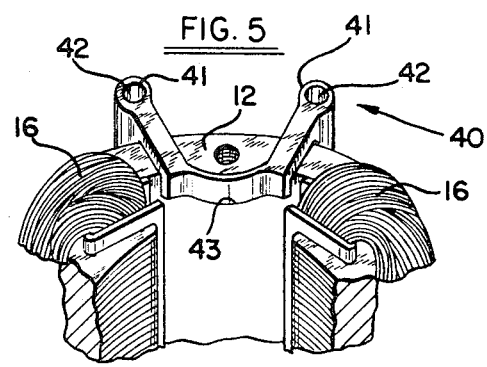
FIG. 5
INVENTORS
WENDELL B. LEIMBACH
JAMES W. MARSHALL
SALVATORE R. ABBRATOZZATO
BY Edward D. Murphy
ATTORNEY

FIELD SUB-ASSEMBLY FOR UNIVERSAL ELECTRIC MOTORS

This invention relates to electric motors and particularly to an improved field sub-assembly and method of assembling fields.

The manufacture of fields for small electric motors usually requires the use of solid wire with an insulative coating for the coils which produce the magnetic field. This wire, referred to as "magnet wire" is usually not sufficiently flexible or resilient for use as the connecting lead from the coil to the remainder of the circuit; accordingly, it is necessary to make a connection between the ends of the coil wire and stranded wire which extends to another coil or to a brushholder, switch, etc. The stranded wire is usually referred to as "lead wire".

In the mass production of such fields, a major obstacle to fully automated production has been the step of connecting the lead wire to the magnet wire. This connection, while quite simple in a hand-assembly process, presents rather complex problems in a machine-assembly process due to the difficulties of controlling and locating the coil ends. In addition, even in a hand process, the connection means which have previously been used are unnecessarily expensive. The purpose of this invention is the provision of an improved field sub-assembly for universal motors which overcomes these difficulties and which permits full automation of the motor assembly process.

Accordingly, the objects of this invention broadly include the provision of an improved field sub-assembly and an improved method of assembling fields which reduce the complexity and the expense of production of electric motor fields.

It is a more specific object to provide a field sub-assembly for universal motors which provides for simple, plug in connection to the remainder of the motor circuit.

Another object of this invention is the provision of an improved method of assembling fields for universal motors which is faster and less costly than previous methods, and which is adapted to machine-implementation.

It is also an object of this invention to provide a simplified means for terminating the coil ends of the field of a universal motor so that they are machine-locatable.

It is also an object of this invention to provide a new and improved terminal for wire coils which simplifies the interconnection of the coil in a circuit.

A further object of this invention is the provision of an improved connection from magnet wire to lead wire in a motor field.

Another object of this invention is the provision of a connection means for electric motor stator coils which is adapted for use in automated stator manufacturing equipment.

Further objects and advantages of this invention will become apparent as the description and illustration thereof proceed.

Briefly, in accord with one embodiment of this invention, a field sub-assembly for a universal electric motor is provided which includes a conventional stack of annular laminations having inwardly extending pole pieces which define slots for receiving coils of wire. In accord with this invention, an insulative block is mounted on the end of the core and terminal supported by the block receive the start and end portions of the coil wire. The improved terminal preferably comprises a channel portion which is crimped to the coil wire and a socket portion which can later receive test probes, stranded wire or a direct engagement with another circuit element.

The improved process includes the steps of winding the coil on the pole piece and retaining the leads against loosening until the lead ends of the magnet wire to another terminal before releasing control over the position and tension of the wire.

In the drawings,

FIG. 1 is a perspective view of a completed universal motor field which embodies a preferred form of this invention;

FIG. 2 is an exploded perspective view of the connection assembly of FIG. 1;

FIG. 3 is a view of an assembled terminal block;

FIG. 4 is a perspective view of a portion of a field embodying an alternative form of this invention; and FIG. 5 is a view similar to FIG. 4 and illustrating a third embodiment of this invention.

In FIG. 1, a field sub-assembly for a universal motor which embodies the present invention is illustrated. The field comprises a core 10 made up of a stack of laminations 11, all of which are of corresponding shape. The laminations are secured together, for example, by welding. The shape of the laminations defines an annular core body 12 and a pair of pole pieces 13 through which magnetic flux is directed across an armature (not shown) to cause operation of the motor. Two pairs of winding slots 14 are defined between the tip of the pole pieces 13 and the annular body 12. An insulating slot liner 15 is placed in each of the slots and, in accord with the usual practice, a coil of wire 16 is wound around each of the pole pieces in one pair of winding slots. The wire used for these coils is solid with a thin insulative coating and is generally referred to as magnet wire. This wire is used for these coils because of its relatively low cost; however, in many motor applications it is not suitable for use as an unsupported lead to an adjacent circuit element because it is not sufficiently flexible to be directed easily along a desired path, it is not sufficiently resilient to withstand vibration and it is not sufficiently insulated. Accordingly, it is necessary to connect this wire to a stranded, insulated wire which is referred to as the lead wire.

In previous constructions, the manner of accomplishing this interconnection has almost invariably involved a hand operation. Furthermore, this connection has been unnecessarily expensive in that it required extra hand-performed steps and extra parts. Furthermore, previous field sub-assemblies, as completed, have not been convenient for testing, handling or further assembly. For example, one common practice is to simply cut the magnet wire after the coils have been wound, which results in loosening of the last several turns of the coil and also makes it difficult to locate the ends of the coil by means of a machine. In this case, via a hand operation, these turns have been retightened and the magnet wire has been connected to a lead wire by, for example, soldering and hand stuffing the connected ends into the slot between the pole tips. However, this produces a field having long, uncontrolled lead wires extending from it which increases the time and difficulty of handling the sub-assembly. Finally, in some cases, field coils have been terminated at terminals mounted on the core by processes including one or more hand operations. However, these terminals have required the use of an extra part, with the consequent expense of the part itself and of the step of connecting it to the lead wire, or have required that the lead wire be soldered or welded to the terminal.

In accord with the present invention, a simplified interconnection means and method is provided which avoids these difficulties, minimizes the cost of making the connection and provides a field sub-assembly which is very easily handled either in a machine process or in a hand process. As shown in FIG. 1, a connector block 20 of suitable insulating material such as polysulfone or any other plastic of suitable thermal and mechanical stability is placed on the field core in the area between the pole tips. The connector block 20, shown more clearly in FIGS. 2 and 3, is shaped to conform to the slot and includes shoulders 21 which engage the pole tips 13. The block is also provided with a pair of apertures 22, each of which receives a conductive terminal 23. The terminals comprise a socket such as a sleeve portion 24, a connecting neck portion 25 and a channel portion 26.

The terminals 23 are inserted into the apertures 22 in the insulating terminal blocks and, in the system illustrated in FIG. 1, the terminal blocks are placed in the slots of the field sub-assembly after the coils have been wound. The starting and ending leads of the field coils are then laid in the channel portions 26 and the sides of the channel portion are crimped over the wire. Preferably, the inner surface of the channel portion is formed with sharp edges, not shown, for cutting through the insulative coating on the magnet wire, or the magnet wire may be stripped before placing it in the channel. The magnet wire is severed, preferably at the same time as the channel is crimped. Thus, the field sub-assembly at this point is basically complete and, in contrast to prior art assemblies, the starting and ending leads of the coils are mechanically secured under appropriate tension; electrical contact points are available for test purposes or for further assembly; and the field itself is such that it can be easily handled without inconvenience due to wires extending therefrom and without danger of damage to such wires or to the insulation thereon. Furthermore, since the terminals 23 are in a fixed location on the field, they can be readily located by machine so that hand probing for tests or hand assembly is not required.

As the next step in the assembly of the field, if the motor is to be a series connected universal motor, a section of lead wire 27 is connected appropriately between two of the terminals 23 to connect the opposing ends of the field coils, as shown in FIG. 1.

A particular feature of the subject invention is the provision of terminals having sleeve portions 24 to which lead wire or other circuit elements such as the brushholders can be connected by a simple, plug-in connection. For example, in the case of lead wire, the exposed end which protrudes beyond the insulation for making the connection may be tinned either after stripping or by pretinning the entire wire before the insulation is applied. In any case, if the lead wire is sufficiently stiff, it can simply be inserted into the sleeve without any intermediate parts or without any further interconnection steps to complete the final connection. In the case of a brushholder, a suitable shaped finger can be inserted into the socket. To facilitate this connection and to increase the force holding the lead wire or other element into the sleeve, a tang portion 28 of the sleeve may be bent inwardly so that the inserted element can pass it when it is being inserted and so that the end of the tang portion engages the surface of the element and prevents it from being easily removed. This feature is of substantial value as it enables the final field connections to be of the plug-in type at a minimum cost and with a minimum of assembly complications.

Another aspect of this invention as it concerns this terminal is the selection of a material which can be used both for the crimpable channel and for the sleeve with the resilient tang. This enables the two portions to be integral with one another, which increases the simplicity of the assembly and reduces its cost. However, the customary materials for use in terminals are not satisfactory because they do not retain sufficient resiliency to function properly as the tang in the socket. In addition, the materials generally used for spring devices cannot be used to form the crimp connection because of their tendency to return partially to their original shape.

Accordingly, a material is preferably selected which enables the single part terminal to be capable of both crimp connection and tang retention. To meet these requirements, the material should have suitably high yield strength and ductility. For example, various grades of phosphor-bronze, brass and beryllium-copper may be used. The preferred material, on the basis of adequately meeting these requirements and also on the basis of its cost, is phosphor-bronze since its yield strength is high enough to provide spring retention of the wire in the socket and its ductility is high enough to enable it to be crimped.

FIGS. 4 and 5 illustrate alternative embodiments of the terminal block of this invention which may be preferred in cases where the entire assembly of the field is to be automatic. Specifically, FIG. 4 illustrates a terminal block 30 which includes a terminal support portion supported on the end of the annular portion of the field core and held in place by a pair of leg portions extending, respectively, on the inside and outside of the fields. In this embodiment, the terminal support portion comprises a pair of separated block portions 31 interconnected by a web 32 and including apertures 33 for receiving terminals similar to those illustrated in FIGS. 1-3.

In addition, FIG. 4 illustrates an alternative terminal 34 which comprises a channel portion 35, a socket portion 36 and a tang 37. In this embodiment, the channel 35 may be adapted for a fused connection to an inserted magnet wire by the application of heat to the channel. Of course, a fused connection may also be used in the channel 26 also. The socket 36 comprises a U-shaped strip of suitable metal and one extended end thereof is folded inwardly to form the tang 37.

FIG. 5 illustrates an alternative form of the terminal block wherein the block 40 comprises a pair of independent terminal support portions 41 including apertures 42 which extend externally of the annular portion 12 of the field. A generally L-shaped clamping portion 43 extends inwardly from the terminal support portions and engages the field.

Use of the terminal blocks of either FIG. 4 or FIG. 5, in conjunction with either terminal 23 or 34, enables a unique assembly process to be performed. In previous field assembly processes, a major assembly line bottleneck was produced by the necessity of severing the magnet wire after the coils have been wound. During winding, the machinery keeps the wire under appropriate tension so that the coils produced fit tightly into the slots. However, when the wire is severed, the tension is released and the last few turns spring out from the slots. Then, a hand operation is required to tighten these turns, tape the coils and connect the ends of the coils.

In accord with the present invention, this problem is eliminated by performing the following method; prior to winding, the insulating block of FIG. 4 (or of FIG. 5) is mounted on the field core with terminals in place. The core is then placed in position of the winding machinery. As the needle holding the magnet wire (or, preferably, a double needle for winding both coils) is brought up to the core, the starting end is laid in one of the channel portions. Preferably, the channel portion is crimped at this time to retain this end of the coil. Next, the coil is wound on the core, for example by moving an oscillating needle through the coil. When a sufficient number of turns has been completed, the needle is withdrawn from the core and the ending lead, still connected to the needle and thus still under tension, is placed in another channel portion. Crimping of the channel over the wire completes the process and provides the completed field sub-assembly previously described.

In all of the illustrated embodiments, the essential subject matter of this invention pertains to a field sub-assembly in which, by means of the novel structure disclosed, the required field connections are made by the simplest and most economical means and yet provide maximum convenience, ease of handling and also adapt themselves to automated assembly. Accordingly, while several specific embodiments have been illustrated and described, it will be clear to those skilled in the art that many changes and modifications can be made therefrom without departing from the true spirit and scope of this invention. The concept of a one-part terminal for securing and retaining the ends of the wound coils and also adapted for plug-in connection of test probes or circuit elements and mounted by means of approximately configured terminal blocks supported on the field, as well as the concept of maintaining tension in the coil by the winding apparatus until after the coil end has been mechanically secured, may also find expression in other forms than those specifically illustrated. Accordingly, it is intended that the appended claims cover all such changes and modifications as may fall within the true purview of this invention.

We claim:

1. A wound field sub-assembly for a universal electric motor comprising a field core including a stack of annular laminations secured together; said core having two pole pieces, each of said pole pieces defining a pair of winding slots in said core; a coil of wire wound in each of said pairs of slots; a pair of insulating terminal blocks mounted on said core, each of said blocks including a terminal support portion; a pair of terminal means for connecting said coils in a motor circuit supported by each of said blocks, each of said terminal means including a first portion connected to an end of one of said coils, and a second portion integral with said first portion and adapted to receive a connection to said circuit.

2. A sub-assembly as claimed in claim 1 wherein said connection to said circuit comprises a lead wire.

3. A sub-assembly as claimed in claim 1 wherein said first integral portion of said terminal comprises a U-shaped channel for receiving said wire end.

4. A sub-assembly as claimed in claim 1 wherein said second integral portion comprises a socket and a tang protruding inwardly into said sleeve for retaining said element therein.

5. A sub-assembly as claimed in claim 4 wherein said terminals have a yield strength sufficient so that said tang provides a retaining force on said element and a ductility sufficient to permit said first portion to be crimped to said wire end.

6. A wound field subassembly for a series-connected universal motor, comprising a field core including a stack of laminations secured together, said field core having two pairs of winding slots formed therein, each pair of winding slots having a pole piece formed therebetween, each pole piece having a pair of circumferentially-spaced tips, one each adjacent to a respective winding slot; a pair of insulating blocks mounted on said stack, one each between opposed tips of the respective pole pieces; each block having first and second spaced conductive means included thereon, respectively adjacent to said winding slots; a pair of coils, one each wound between a respective pair of winding slots, each coil having a pair of terminals, one each of said terminals secured to a respective conductive means, and a lead connecting the respective coils in series with each other, said lead being connected between a pair of opposed conductive means on said respective inserts.

7. A sub-assembly as claimed in claim 4 wherein said socket includes a tang portion for retaining said element in said socket.

8. A sub-assembly as claimed in claim 7 wherein said wire end interconnection means comprises a channel portion secured to said wire.

9. A sub-assembly as claimed in claim 8 wherein said terminals have a yield strength sufficient so that said tang provides a retaining force on said element and a ductility sufficient to permit said channel portion to be crimped to said wire end.

10. A sub-assembly as claimed in claim 9 wherein said terminals are phosphor-bronze.

11. A sub-assembly as claimed in claim 1 wherein said blocks are each disposed within said core and between the ends of said pole pieces.

12. A sub-assembly as claimed in claim 11 wherein said circuit interconnection means comprises a socket disposed in an aperture in said terminal block, and wherein said wire end interconnection means comprises a channel portion integral with said sleeve.

13. A wound field sub-assembly for an electric motor comprising a field core including a stack of laminations secured together; said core including an annular portion enclosing at least two pole pieces, each of said pole pieces defining a pair of winding slots in said core; a coil of wire wound in each of said pairs of slots; a plurality of insulating terminal blocks mounted on said core, each of said terminal blocks including a terminal support portion and a pair of leg portions, said leg portions engaging said annular portion between said pole pieces, and said terminal support portion being located on one end of said core; at least one conductive terminal supported by each of said blocks, each of said terminals comprising means for interconnection to a wire end of one of said coils and means for interconnection in a circuit.

14. A sub-assembly as claimed in claim 13 wherein said circuit interconnection means comprises a socket, said socket including a tang retaining means, and said wire end interconnection means comprises a channel portion.

15. A sub-assembly as claimed in claim 14 wherein said terminals have a yield strength sufficient so that said tang provides a retaining force on said element and a ductility sufficient to permit said channel portion to be crimped to said wire end.

16. An interconnection assembly for electrically joining a coil of wire to a circuit comprising a supporting body; a coil on said body; a pair of insulating blocks mounted adjacent said coil, and a pair of integral, one piece connectors, one of said connectors being supported by each of said blocks, said connectors each comprising a channel portion for receiving an end of said coil, and a socket portion for receiving a connection to said circuit, whereby said coil is connected to said circuit without additional connector parts.

17. An assembly as claimed in claim 16 wherein each of said sockets includes an inwardly projecting tang portion for retaining said element in said socket.

18. An assembly as claimed in claim 17 wherein each of said connectors has a yield strength sufficient so that said tang provides a retaining force on said element and a ductility sufficient to permit said channel portion to be crimped to said wire end.

19. An assembly as claimed in claim 18 wherein each of said connectors are phosphorbronze.

20. An assembly as claimed in claim 17 wherein each of said sockets comprises a cylindrical sleeve and wherein said tang comprises a severed portion of said sleeve.

21. A one-piece electrical connector for directly conductively joining a pair of wires comprising a socket portion adapted to retain one of said wires, said socket portion comprising a substantially cylindrical sleeve and a tang lanced from said cylindrical sleeve and extending inwardly of said sleeve for frictionally engaging said one wire to prevent removal thereof from said sleeve; and a laterally off-set channel portion integral with and extending from said socket portion and adapted to be crimped to the other of said wires whereby said connector is the only part intermediate said wires.

22. A wound field sub-assembly for an electric motor comprising a field core including a stack of laminations secured together; said core including an annular portion enclosing at least two pole pieces, each of said pole pieces defining a pair of winding slots in said core; a coil of wire wound in each of said pairs of slots; a plurality of insulating terminal blocks mounted on said core, each of said terminal blocks including a terminal support portion mounted on the outside of said annular portion and an L-shaped leg portion engaging the inside of said annular portion; at least one conductive terminal supported by each of said blocks, each of said terminals comprising means for interconnection to a wire end of one of said coils and means for interconnection in a circuit.

23. A one-piece electrical connector for directly conductively joining a pair of wires comprising a socket portion adapted to retain one of said wires, said socket portion having a tang extending inwardly thereof for engaging said one wire, and a laterally off-set channel portion integral with and extending from said socket portion and adapted to be secured to the other of said wires whereby said connector is the only part intermediate said wires; said connector having a yield strength sufficient so that said tang provides a retaining force on a side of said one wire and a ductility sufficient to permit said channel portion to be crimped to said other wire.

24. A wound field sub-assembly for a universal electric motor comprising a field core including a stack of annular laminations secured together; said core having two pole pieces, each of said pole pieces defining a pair of winding slots in said core; a coil of wire wound in each of said pairs of slots; a pair of insulating terminal blocks mounted on said core, each of said blocks including a pair of cylindrical apertures; a pair of terminal means for connecting said coils in a motor circuit supported by each of said blocks, each of said terminal means including a generally cylindrical socket disposed in one of said apertures and adapted for connection in said circuit by insertion of a circuit element therein, each of said terminal means also including a laterally off-set channel portion integral with and extending from said socket and adapted to be crimped onto one of said coils of wire, said sub-assembly providing a stable, one-piece interconnection of each of said wire ends in said motor circuit.

* * * * *